Figure 1:
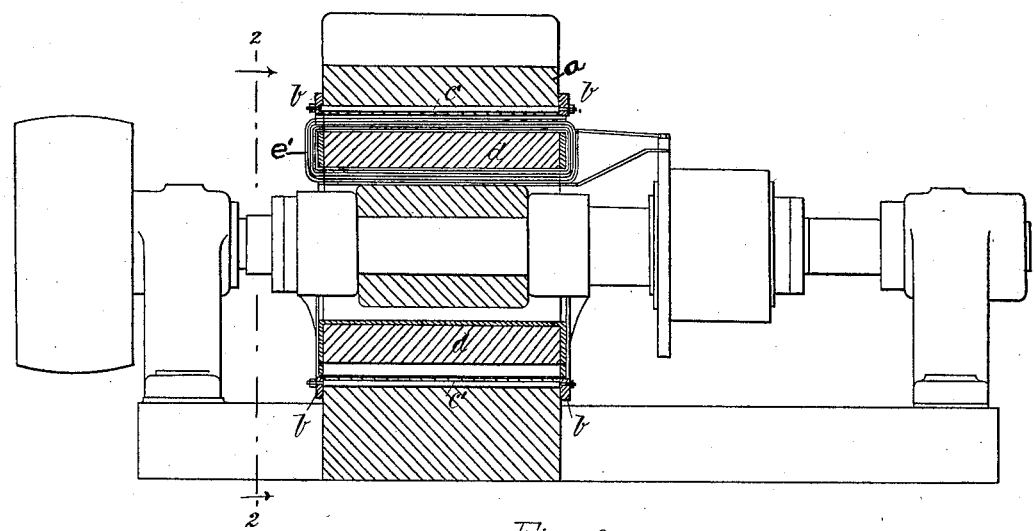

(No Model.) 2 Sheets—Sheet 1.

M. HUTIN & M. LEBLANC.
CONTINUOUS CURRENT DYNAMO ELECTRIC MACHINE.

No. 529,650. Patented Nov. 20, 1894.

WITNESSES:
Fred White
Thomas F. Wallace

INVENTORS:
Maurice Hutin and
Maurice Leblanc,
By their Attorneys:
Arthur C. Fraser & Co.

(No Model.) 2 Sheets—Sheet 2.
M. HUTIN & M. LEBLANC.
CONTINUOUS CURRENT DYNAMO ELECTRIC MACHINE.

No. 529,650. Patented Nov. 20, 1894.

WITNESSES
Fred White
Thomas F. Wallace

INVENTORS:
Maurice Hutin and
Maurice Leblanc,
By their Attorneys
Antun C. Fraser & Co.

THE NORRIS PETERS CO., PHOTO-LITHO., WASHINGTON, D. C.

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

CONTINUOUS-CURRENT DYNAMO-ELECTRIC MACHINE.

SPECIFICATION forming part of Letters Patent No. 529,650, dated November 20, 1894.

Application filed February 12, 1894. Serial No. 499,850. (No model.) Patented in France June 21, 1893, No. 231,027, and in England December 4, 1893, No. 23,309.

*To all whom it may concern:*

Be it known that we, MAURICE HUTIN and MAURICE LEBLANC, citizens of the Republic of France, residing in Paris, France, have invented certain new and useful Improvements in Continuous-Current Dynamos or Motors, of which the following is a specification.

This invention is the subject of Letters Patent in France, No. 231,027, dated June 21, 1893, and in Great Britain, No. 23,309, dated December 4, 1893.

The object of this invention is to prevent the generation of Foucault currents in the field magnets of continuous current dynamo electric motors or generators by the sudden variations of magnetic flux which occur in such machines for a variety of reasons. A prominent cause of sudden variations of the magnetic flux in such machines is found in the generally unequal distribution of iron in the armatures, for instance, in Pacinotti ring machines, where the armatures are formed with projecting teeth symmetrically arranged, but which in their passage before the polar pieces of the field magnets present a varying mass of iron in close proximity to the field poles, whereby the magnetic resistance is varied from moment to moment. These periodic fluctuations of magnetic resistance and consequently of magnetic flux generate Foucault currents in the field magnets, as is well known. Also, in machines of all kinds sudden but not periodic variations of magnetic flux occur when the load of the machines is suddenly changed, which is frequently necessary; and the most prominent sudden variation of magnetic flux sometimes occurs by the accidental breaking of the circuit of an armature coil while the machine is running at high speed. In all these cases and in others, which will be apparent to those skilled in the art, heavy and injurious Foucault currents will be suddenly generated in the field magnets.

By our invention the formation of Foucault currents by variations of magnetic flux is prevented. We accomplish this by placing within the path of the magnetic flux a circuit of exceedingly low resistance which, while unaffected by the magnetic flux so long as the same remains constant, absorbs the sudden variations of the same by the generation of electric currents within itself, so that the field magnets remain unaffected by such variations. Broadly speaking, therefore, our invention consists in consuming the energy represented by fluctuations of magnetic flux in dynamo electric machines, by the generation of electric currents in an independent circuit, and thereby preventing the generation of Foucault currents by such fluctuations. All this will more fully appear from the following detail description with reference to the accompanying drawings, in which—

Figure 2:
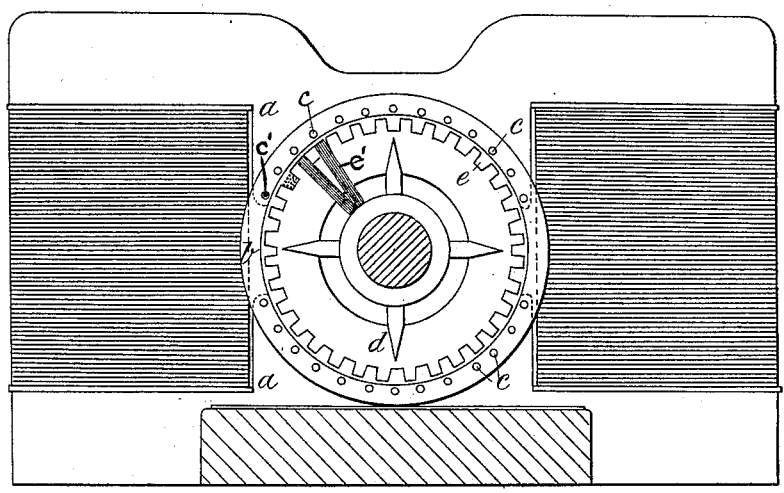
Figure 5:
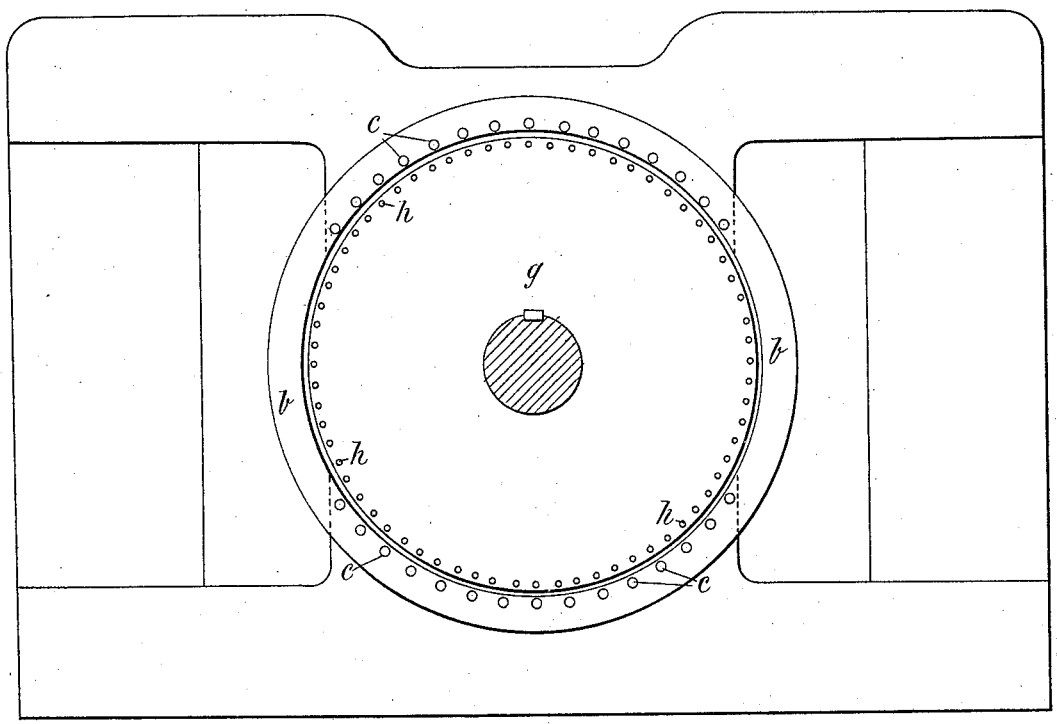
Figure 3:
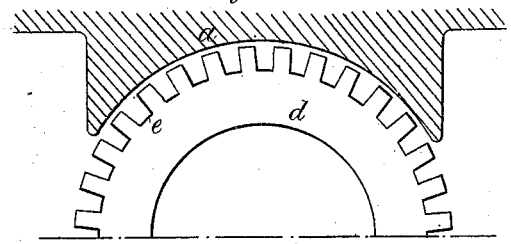
Figure 4:
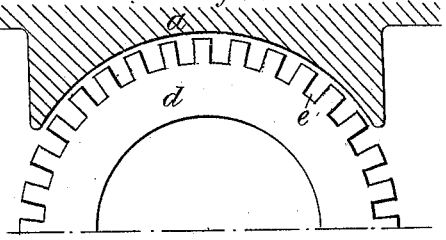

Figure 1, is a side elevation of a dynamo, partly in vertical longitudinal mid-section. Fig. 2, is a transverse section thereof on the line 2—2 in Fig. 1. Figs. 3 and 4 are diagrammatic views corresponding to a part of Fig. 2; and Fig. 5, is an end view partly in section, showing the invention applied to a different form of machine.

The causes of periodic variations of the magnetic flux in direct current motors or generators will become clear from a contemplation of Figs. 3 and 4. In these figures of drawings are shown a portion of a Pacinotti ring core $d$ (the winding being omitted) and a field magnet pole $a$, in proper relation thereto. The circumferential surface of the ring is formed with indentations or recesses $e$ between which the teeth or projections of the ring appear. Fig. 3 shows one phase of operation and Fig. 4, the next succeeding phase of operation, and it will be seen at once that in the condition of the machine shown in Fig. 3, there are ten teeth of the armature ring directly opposed to the pole piece while in the condition of the machine represented in Fig. 4, there are eleven such teeth immediately in front of the polar extension. The magnetic flux, therefore, will suddenly increase as the armature moves from its position in Fig. 3, to its position in Fig. 4, and it will suddenly decrease as the armature moves from the position shown in Fig. 4, to that shown in Fig. 3. In machines of other types similar sudden fluctuations of magnetic flux occur.

In Figs. 1 and 2 our invention is shown as applied to a Pacinotti machine, the construction of which is so well known that it need not be specifically described except so far as it relates to this invention. The polar extensions $a\ a$, of the field magnets surround the greater part of the armature core $d$, in the recesses $e$ of which the coils $e'$ are wound, and are connected with the commutator in the ordinary manner. On each side of the machine, placed against the polar extensions $a\ a$, is a ring $b$ of non-magnetic metal of very low electrical resistance, such as copper, brass, bronze, &c. The interior diameter of this ring is equal to the diameter of the circle defined by the curves of the polar extensions. These latter are perforated at regular distances on the line of a circle concentric to but slightly larger than the inner circle of the rings $b$, and through these perforations and through corresponding perforations $c$ in the rings $b\ b$, pass copper rods $c'$ which are insulated where they thread through the pole pieces, but are bare at the ends where they are connected electrically with the rings $b\ b$ and are secured to the same by riveting or by nuts, or in any other suitable manner.

The combined rings $b\ b$, and copper bolts or rods $c'$, constitute at the surface of the interpolar space a series of electrical circuits of very low resistance. These circuits are intersected by the magnetic flux between the field pole pieces and the armature, and so long as this flux remains constant the circuits remain inert; but at each sudden variation of the magnetic flux currents are generated in these circuits thus consuming the variation of flux and rendering it incapable of producing Foucault currents in the field magnets. The lower the resistance of these circuits (or of a single equivalent circuit) the more completely are the variations of magnetic flux absorbed by the same.

In a machine provided with this improvement all sudden variations of the magnetic flux are obliterated and variations in the energy stored in the machine will therefore become gradual under all circumstances. The circuits, therefore, which we place in or very near the interpolar space operate in the nature of a dash-pot to dampen or to deaden the variations of magnetic flux, and we have, therefore, called these circuits "deadening circuits."

In Fig. 5, our invention is shown as applied to a machine, the armature of which is composed of disks $g$, and rods $h$, which latter constitute the winding, while the disks constitute the core of the armature. The deadening circuits are mounted on the field polar extensions substantially in the manner described with reference to Figs. 1 and 2.

Heretofore the field magnet cores of continuous current dynamo machines (either motors or generators) have been made laminated when it was desired to prevent the formation of injurious Foucault currents; but with our invention the lamination of the field magnet cores becomes unnecessary, since the deadening circuits will effectually prevent the formation of such currents.

From the foregoing it will be understood that the deadening circuit in order to be effective for the purposes of this invention must be located somewhere in the path of the magnetic flux, and that it will be the most effective if it is crossed by the whole flux. From this it follows that the best location of the deadening circuit will be within the interpolar space, but so that it will not prevent the nearest possible approach between the armature and the pole pieces. It will also be clear to those skilled in the art, that by the suppression of Foucault currents the generation of extra currents in the coils of the machine is prevented. These facts conspire to suppress dangerous sparking, especially by accidental breaks of circuits within the machine, to prevent undue heating and to suppress the noises emitted by machines in which periodic variations of magnetic flux occur.

In an application filed by us on August 20, 1892, Serial No. 443,565, we show the use of our deadening circuit in connection with alternating current machines, especially motors. In such machines the deadening circuit, while also suppressing the formation of Foucault currents, performs an additional and more important function. The present invention is confined to the use of a deadening circuit or circuits in continuous current machines, where it renders the lamination of the field magnet cores unnecessary.

Having now fully described our invention, we claim and desire to secure by Letters Patent—

1. A continuous current dynamo electric machine, provided with one or more electrical circuits of low resistance, closed upon themselves and threading through the polar extensions of the field magnets, substantially as described.

2. In a continuous current dynamo electric machine, a deadening circuit for the consumption or obliteration of variations of magnetic flux, consisting of two metallic rings of low resistance, one on each side of the field magnet poles and electrically joined by cross connections of low resistance, insulated from the pole pieces, substantially as described.

3. In a continuous current dynamo electric machine, a deadening circuit for the consumption or obliteration of variations of magnetic flux, consisting of two metallic rings of low resistance, one on each side of the field magnet poles and joined by metallic rods of low resistance passing through perforations in the pole pieces, but insulated therefrom, substantially as described.

In witness whereof we have hereunto signed our names in the presence of two subscribing witnesses.

MAURICE HUTIN.
MAURICE LEBLANC.

Witnesses:
CLYDE SHROPSHIRE,
JULES ARMENGAUD, Jeune.